US012658832B2

(12) United States Patent
Lagerweij et al.

(10) Patent No.: US 12,658,832 B2
(45) Date of Patent: Jun. 16, 2026

(54) METHOD FOR CONTROLLING AN ELECTRIC GENERATOR OF A WIND TURBINE

(71) Applicant: Wobben Properties GmbH, Aurich (DE)

(72) Inventors: Ewout Lagerweij, Apeldoorn (NL); Andre Pubanz, Amersfoort (NL); Nils Noffke, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 77 days.

(21) Appl. No.: 17/798,529

(22) PCT Filed: Feb. 10, 2021

(86) PCT No.: PCT/EP2021/053250
§ 371 (c)(1),
(2) Date: Aug. 9, 2022

(87) PCT Pub. No.: WO2021/160699
PCT Pub. Date: Aug. 19, 2021

(65) Prior Publication Data
US 2023/0088734 A1 Mar. 23, 2023

(30) Foreign Application Priority Data
Feb. 13, 2020 (DE) ..................... 10 2020 103 834.8

(51) Int. Cl.
| | |
|---|---|
| *H02P 9/10* | (2006.01) |
| *F03D 7/02* | (2006.01) |
| *F03D 7/04* | (2006.01) |
| *F03D 9/25* | (2016.01) |
| *H02P 101/15* | (2016.01) |

(52) U.S. Cl.
CPC .............. *H02P 9/105* (2013.01); *F03D 7/028* (2013.01); *F03D 7/046* (2013.01); *F03D 9/25* (2016.05);
(Continued)

(58) Field of Classification Search
CPC ...... H02P 9/105; H02P 2101/15; F03D 7/028; F03D 7/046; F03D 9/25; F05B 2220/706;
(Continued)

(56) References Cited

U.S. PATENT DOCUMENTS

| | | | | |
|---|---|---|---|---|
| 11,095,124 B2 * | 8/2021 | Brombach | ................ | H02J 3/46 |
| 2002/0103745 A1 | 8/2002 | Lof et al. | | |

(Continued)

FOREIGN PATENT DOCUMENTS

| | | |
|---|---|---|
| EP | 2 043 255 A2 | 4/2009 |
| EP | 2 485 388 A1 | 8/2012 |

(Continued)

*Primary Examiner* — Tulsidas C Patel
*Assistant Examiner* — Thomas K Quigley
(74) *Attorney, Agent, or Firm* — Seed Intellectual Property Law Group LLP

(57) ABSTRACT

Provided is a method for controlling an electric generator of a wind turbine. The method includes varying an amplitude and/or phase angle of an harmonic current of said electric generator, while said electric generator is rotating, in particular at a known condition, measuring a signal indicative of generator vibration after and/or during varying said amplitude and/or phase angle, repeating said varying and said measuring until a predetermined requirement is met, evaluating an operating point for said electric generator by using said measured signals indicative of generator vibration in order to reduce a ripple torque of said generator, and controlling a current, in particular said harmonic current, of said electric generator in order to meet said operating point.

32 Claims, 9 Drawing Sheets

(52) U.S. Cl.
CPC ... *F05B 2220/706* (2013.01); *F05B 2270/333* (2013.01); *F05B 2270/334* (2013.01); *F05B 2270/807* (2013.01); *F05B 2270/81* (2013.01); *H02P 2101/15* (2015.01)

(58) Field of Classification Search
CPC .......... F05B 2270/333; F05B 2270/334; F05B 2270/807; F05B 2270/81
See application file for complete search history.

(56) References Cited

U.S. PATENT DOCUMENTS

2014/0091622 A1    4/2014   Lucas et al.
2019/0081583 A1*   3/2019   Xie ........................ H02P 21/05

FOREIGN PATENT DOCUMENTS

| | | | | |
|---|---|---|---|---|
| EP | 2 552 013 | A1 | 1/2013 | |
| EP | 2 869 458 | A1 | 5/2015 | |
| EP | 3 010 143 | A1 | 4/2016 | |
| EP | 3 076 542 | A1 | 10/2016 | |
| EP | 3 297 156 | A1 | 3/2018 | |
| EP | 3 454 469 | A1 | 3/2019 | |
| EP | 3 480 931 | A1 | 5/2019 | |
| EP | 3 565 106 | A1 | 11/2019 | |
| EP | 3 614 556 | A1 | 2/2020 | |
| EP | 3494635 | B1 * | 10/2020 | .............. H02P 25/22 |
| WO | 2018/153591 | A1 | 8/2018 | |
| WO | 2019/028269 | A2 | 2/2019 | |
| WO | 2019/120406 | A1 | 6/2019 | |

* cited by examiner

| | |
|---|---|
| Bin 0: 100-200 | ◁ |
| Bin 1: 200-300 | ◁ |
| Bin 2: 300-400 | ◁ |
| ... | ◁ |
| Bin 48: 4800-4900 | ◁ |
| Bin 49: 4900-5000 | ◁ |

700

500'

516 Update a status of the test

518 Update the simplex

512 Provide or select new parameters to be tested

514 Test the new parameters a number of times or until a predetermined requirement is met

700'

| | | Rotor azimuth angle | | | |
|---|---|---|---|---|---|
| | | Bin 0:<br>0-30 | Bin 1:<br>30-60 | ... | Bin 12:<br>330-360 |
| Generator current | Bin 0: 100-200 | △ | △ | △ | △ |
| | Bin 1: 200-300 | △ | △ | △ | △ |
| | Bin 2: 300-400 | △ | △ | △ | △ |
| | ... | △ | △ | △ | △ |
| | Bin 48: 4800-4900 | △ | △ | △ | △ |
| | Bin 49: 4900-5000 | △ | △ | △ | △ |

Fig. 6C

METHOD FOR CONTROLLING AN ELECTRIC GENERATOR OF A WIND TURBINE

BACKGROUND

Technical Field

The invention is related to a method for controlling an electric generator of a wind turbine as well as a method for operating such a wind turbine and such a wind turbine.

Description of the Related Art

Torque ripple is an effect seen in many electric machines, referring to a periodic increase and decrease in output torque as the shaft of said machine rotates.

Electric generators of wind turbines also show this effect.

Torque ripple (also known as ripple torque) is caused by the stator currents interacting with the magnetic circuits of stator and/or rotor.

Usually, this effect is reduced by a carefully selected winding layout, magnetic topology and magnetic geometry.

In view of the above, an enhanced method for controlling an electric generator of a wind turbine is sought, in particular one which is independent of said winding layout, magnetic topology and magnetic geometry.

The German Patent and Trademark Office searched the following prior art in respect to the priority application for the present application: EP 3 297 156 A1, EP 3 454 469 A1, EP 2 552 013 A1, EP 3 614 556 A1, EP 2 043 255 A2, EP 2 869 458 A1, EP 3 010 143 A1, EP 3 076 542 A1, EP 3 480 931 A1, EP 3 565 106 A1 and WO 2018/153591 A1.

BRIEF SUMMARY

According to a first aspect, a method for controlling an electric generator of a wind turbine, comprises the steps of: varying an amplitude and/or phase angle of an harmonic current of said electric generator, while said electric generator is rotating, in particular at a known condition, measuring a signal indicative for a generator vibration after and/or during varying said amplitude and/or phase angle, repeating said varying and said measuring until a predetermined requirement is met, evaluating an operating point for said electric generator by using said measured signals indicative for a generator vibration in order to reduce a ripple torque of said generator and controlling a current, in particular said harmonic current, of said electric generator in order to meet said operating point.

Thus, a method for optimizing an operating point of a generator of a wind turbine is proposed, in particular, a method, wherein the ripple torque of said generator is reduced.

Moreover, the proposed method may be used in addition and/or during normal operation mode of a wind turbine. The proposed method may also be used to initialize settings of a wind turbine and/or of a wind turbine control unit.

For example, said wind turbine is operated in normal operation mode at known conditions, e.g., a known rotational speed and/or known torque. Then, the proposed method may be performed in addition to said normal operation mode. In another example, the proposed method may be used to determine the operation parameters of a wind turbine after said wind turbine has been erected.

In a first step of the proposed method, an amplitude and/or phase angle of said electric generator harmonic current is varied, in particular while said electric generator is rotating, in particular at a known condition, e.g., at a known rotational speed of said generator.

In particular, said amplitude of the harmonic current is varied between 0 and 5% of the fundamental current. Preferably, said amplitude is related to the normal or nominal torque of said generator or said amplitude is related to a known torque at a specific operating point. In a preferred embodiment, the speed and/or the torque of said generator is also known.

In particular, said phase angle of the harmonic current is varied between 0 and 360 degrees, where the phase angle is the angle between the zero crossing of the harmonic current relative to the fundamental current, expressed in degrees of the angle of the harmonic current.

In particular, said know condition may also be the electrical working point, defined by the speed, fundamental current, voltage, angle between fundamental current and voltage. The working point may be constantly varying in a wind turbine (no, low, medium, high, full power). In another embodiment, said known condition may also comprise at least one information about the following: generator torque, rotor speed, generator current, air gap variation, temperature distribution of generator rotor and generator stator.

In a second step, a signal indicative for a generator vibration is measured after varying said amplitude or phase angle of the harmonic current.

Said vibrations may be measured by sound, noise, mechanical acceleration or mechanical vibration, in particular of said generator, hub, nacelle, main bearing and/or a rotor blade, and/or any other structural part of said wind turbine.

Preferably, said generator vibrations are mechanical vibrations between 5 hertz (Hz) and 500 Hz, more preferably between 15 Hz and 360 Hz, in particular caused by ripple torque of said generator.

In a preferred embodiment, an acceleration signal indicative for a generator vibration is measured by an accelerometer mounted on the hub of said wind turbine.

This measured signal may also be stored as data, e.g., in a database or a lookup table. For example, the signals are measured on time base, e.g., the vibrations are measured over time, e.g., every 0.1 second. In another embodiment, the signals are measured position based, e.g., every 90 degrees of rotor rotation.

In a third step, said varying and said measuring is repeated until a predetermined requirement is met, in particular with different amplitude and/or phase angles.

For example, the predetermined requirement is a fixed value, e.g., five. Then, said varying and said measuring is repeated with different amplitudes and/or phase angles until five signals indicative for a generator vibration are obtained. Hence, the proposed method may collate different values of said generator in different operating points. If the predetermined requirement is met, the collected data, collected by said varying and said measuring, is used in a next step.

In a fourth step, an operating point for said electric generator is evaluated by using said measured signals indicative for a generator vibration in order to reduce a ripple torque of said generator.

For example, five different signals indicative for a generator vibration are obtained by five different phase angles. Then, the phase angle with the least generator vibration is chosen as a new operating point for the harmonic current, e.g., by comparing with an operating curve.

Hence, said new operating point has less torque ripple then the operating point before and thus, the ripple torque of said generator is reduced.

Therefore, the proposed method works with shifting variables, which may shift during operation, instead of fixed values, which are normally used to counter current harmonics.

In a fifth step, a current of said electric generator is controlled in order to meet said new operating point.

For example, the current to be controlled is a stator current of said generator which is controlled via an active rectifier connected to said stator. Then, said stator current is controlled by the proposed method.

Additionally, said current may also be controlled via a damping signal, which is, for example, a harmonic of a generator frequency or a non-integer harmonic of said generator frequency. In this case, the proposed method provides a current, which may be added to another current controlling said generator. Hence, said current is controlled via a damping signal in order to meet said new operating point.

Thus, a method is provided which is independent of the winding layout of the electric generator and thus, the proposed method can be used on any electric generator of any wind turbine.

Hence, the proposed method may also be used on already installed wind turbines to lower their noise without changing the winding layout and/or any other hardware of said already installed wind turbines.

Moreover, the proposed method is a method of optimized parameters, which may also be used to optimize parameters of a wind turbine control unit during operation of said wind turbine.

For example, the proposed method may be executed continuous or once a week or anytime when said wind turbine provides too much noise or vibrations.

In a preferred embodiment, said amplitude or phase angle is varied via a converter connected to said electric generator, in particular via an active rectifier connected to said generator.

Preferably, said electric generator is a permanent magnet synchronous generator which is connected to an active rectifier which is designed to control a current of said permanent magnet synchronous generator.

In a preferred embodiment, said amplitude or phase angle are calculated by a counter ripple torque module.

Preferably, said counter ripple torque module is designed to calculate a current to be injected in order to reduce said torque ripple. Said calculated current is preferably a current of said electric generator.

In a preferred embodiment, said varying is performed by an injection of a current, in particular a current harmonic, e.g., $6^{th}$ or $12^{th}$ harmonic relative to a fundamental.

Hence, said repeating of said varying and said measuring is performed by injection of a fixed current harmonic, e.g., $6^{th}$ or $12^{th}$ harmonic of a fundamental, with continuously varying said amplitude and/or said phase angle. Said current harmonic may also any fractural or floating number like 6.2 or 6.3.

In a preferred embodiment, said signal indicative for a generator vibration is measured by sensor placed on a hub of said wind turbine.

Said sensor may be a microphone or an accelerometer. In another embodiment, said sensor is a displacement or velocity sensor. Said sensor may also be a laser pointing to a surface of said wind turbine or generator.

In another embodiment, other physical quantities apart from acceleration like magnetic flux or generator current could be measured to infer the system excitation. According sensors would be a magnetic flux sensor, e.g., a hall sensor, or a current and/or voltage sensor, e.g., for measuring a generator current and/or voltage.

Preferably, said sensor is an accelerometer placed in the hub of said wind turbine, in particular on an inner side of said hub next to a pitch bearing.

In a preferred embodiment, said predetermined requirement is a predefined number, counting an amount of iteration cycles.

Thus, said varying and said measuring are repeated until a predefined number of measurements are fulfilled.

For example, said predefined number is five. Then, the proposed method comprises five repetition cycles, in particular said amplitude and/or said phase angle are varied five times and said signals are also be measured five times.

For this, a lookup table may be used comprising all measured signals indicative for a generator vibration.

Then, an amplitude and/or phase angle indicating the lowest vibrations, in particular producing the lowest ripple, is chosen for said new operating point.

In a preferred embodiment, said repeating is performed continuously until said predetermined requirement is met.

For example, said amplitude and/or phase angle is varied every third rotation of said electric generator or every ten seconds.

In a preferred embodiment, said repeating is performed as an offset variation or by a varying offset either to said phase angle or said amplitude.

For example, said electric generator is rotating at known conditions having an operation phase angle. For this case, the proposed method does an offset variation of said operation phase angle in order to find a phase angle having the same performance while having lower torque ripple. Preferably, said phase angle is varied by tenths of a percent, e.g., +1-0.1%.

In a preferred embodiment, said operating point is evaluated to reduce vibrations of the $6^{th}$ harmonic or a multiple of $3^{rd}$ or said $6^{th}$ harmonic of the fundamental current of said generator.

In a preferred embodiment, said wind turbine further comprises a wind turbine control unit (e.g., wind turbine controller) and said method further comprising the step of: implementing new parameters in said wind turbine control unit based said operating point.

Hence, the proposed method may be used to optimize controlling parameters of a wind turbine. In particular, the proposed method leads to new parameters, which may be implemented into a wind turbine control as new parameters.

In a more preferred embodiment, said new parameters comprise at least a torque set point.

Hence, said wind turbine may be a torque controlled wind turbine.

In a preferred embodiment, said operating point is generated by means of an adaptive or self-learning controller and/or by a method of an offset variation.

In another embodiment, said operating point is generated by a numerical method, in particular by using an objective function. Preferably, said numerical method uses the concept of a simplex. In a more preferred embodiment, said numerical method is a direct search method, in particular is a Nelder-Mead method or similar.

Therefore, said evaluating comprises at least a numerical method and/or an objective function and/or a simplex and/or direct search method and/or a Nelder-Mead method and/or data binning and/or said operating point is generated by a numerical method and/or an objective function and/or a simplex and/or direct search method and/or a Nelder-Mead method and/or data binning.

In a more preferred embodiment, said evaluating comprises a continuous process using a numerical method and/or an objective function and/or a simplex and/or a Nelder-Mead method and/or data binning and/or said operating point is generated by a continuous process using a numerical method and/or an objective function and/or a simplex and/or direct search method and/or a Nelder-Mead method and/or data binning.

In a preferred embodiment, said evaluating is performed based on a lookup table or by feedback loop control.

Hence, the measured values are stored in a lookup table, which is then used to evaluate a new operating point or a feedback loop is used.

In a preferred embodiment, said operating point is described by at least one or more mechanical states of said generator, and/or said operating point comprises at least one information of a rotational position of a rotor of said electric generator; a temperature of said generator; a speed of said generator; a torque of said electric generator.

According to a second aspect, a method for operating a wind turbine, comprises the steps of: rotating an electric generator of said wind turbine at a known condition, performing a method for controlling an electric generator as described above or below and feeding electrical energy into an electrical supply grid, while said generator is in said operating point.

Thus, the proposed method for controlling an electric generator may be used in addition to a normal method for operating a wind turbine.

Moreover, said proposed method for controlling an electric generator may be implemented automatically, e.g., by checking necessary conditions for starting said method.

In a preferred embodiment, said performing is only started, when a necessary criterion is met.

For example, a fixed vibration value is used as a necessary criterion to detect whether said method for controlling an electric generator has to be started or not. If said value is exceeded, said method will be initialized.

For example, the method for controlling an electric generator is only started when noise or vibrations are detected, in particular vibrations between 10 Hz and 250 Hz, in particular between 50 Hz and 150 Hz or vibrations having a frequency between 200-600*rotor speed/60, in particular about 400*rotor speed/60.

In a more preferred embodiment, a condition device (e.g., controller) checks said necessary criterion.

Hence, said sensor is connected to a condition device which is designed to evaluate the collected signals of said sensor and is preferably also designed to evaluate if the setting of said wind turbine, in particular the setting of a wind turbine control unit, are operationally optimized.

In a preferred embodiment, said performing in only applied, when a conditional criterion is met.

Hence, after starting said method for controlling an electric generator it is also checked whether said method can be carried out or not.

For example, the temperature of said electric generator is checked and if said temperature is too high, said method will not be performed.

Such a conditional criterion may be a torque of said electric generator or a temperature of said generator.

In a preferred embodiment, a wind turbine control unit checks said conditional criterion.

In a preferred embodiment, said method further comprises the step of: suppressing said method for controlling an electric generator if at least one of the following criteria is met: said sensor detects heavy vibrations; night time.

Hence, the proposed method for controlling an electric generator, in particular via offset variation, is stopped when, for example, heavy vibrations are detected by said sensor or when it gets late and/or night, e.g., between 10 p.m. and 6 a.m.

According to a third aspect, a wind turbine comprises an electric generator, which is controlled by a method as described above or below.

For this, said wind turbine may also comprise a sensor, which is designed to measure signals indicative for a generator vibration.

Preferably, said sensor is an accelerometer, which is mounted on a rotating part of said wind turbine.

In a preferred embodiment, said wind turbine further comprises a sensor placed on a hub of said wind turbine.

In a more preferred embodiment, said sensor is designed to detect a vibration or a sound of said wind turbine and/or said electric generator and/or a wind turbine blade.

In an even more preferred embodiment, said sensor is an outdoor microphone or an accelerometer.

Preferably, said sensor is an accelerometer placed in the hub of said wind turbine, in particular on an inner side of said hub next to a pitch bearing.

In a preferred embodiment, said wind turbine comprises a counter ripple torque module for calculating an amplitude or a phase angle of said electric generator.

In a preferred embodiment, said wind turbine further comprises a converter which is connected to said counter ripple torque module and said electric generator in order to control a current of said electric generator.

In a preferred embodiment, said wind turbine further comprises an interface, which is designed to receive an information, in particular a script, used for the evaluation of said operating point and/or to provide an information about said evaluation to a third party interface.

In a preferred embodiment, said generator is, in particular, a permanent magnet synchronous generator, with an active rectifier and said active rectifier, which is designed to control a current of said generator.

In a preferred embodiment, said wind turbine comprises a condition device, which is designed to check whether a criterion for performing said evaluating is met or not.

In a preferred embodiment, said wind turbine comprises an adaptive or self-learning controller and/or a control unit for performing a method of an offset variation in order to obtain an operating point.

BRIEF DESCRIPTION OF THE SEVERAL VIEWS OF THE DRAWINGS

With reference to the appended drawings, below follows a more detailed description of embodiments cited as examples.

FIG. 6C shows an example of an advanced bin table.

DETAILED DESCRIPTION

Figure 1:
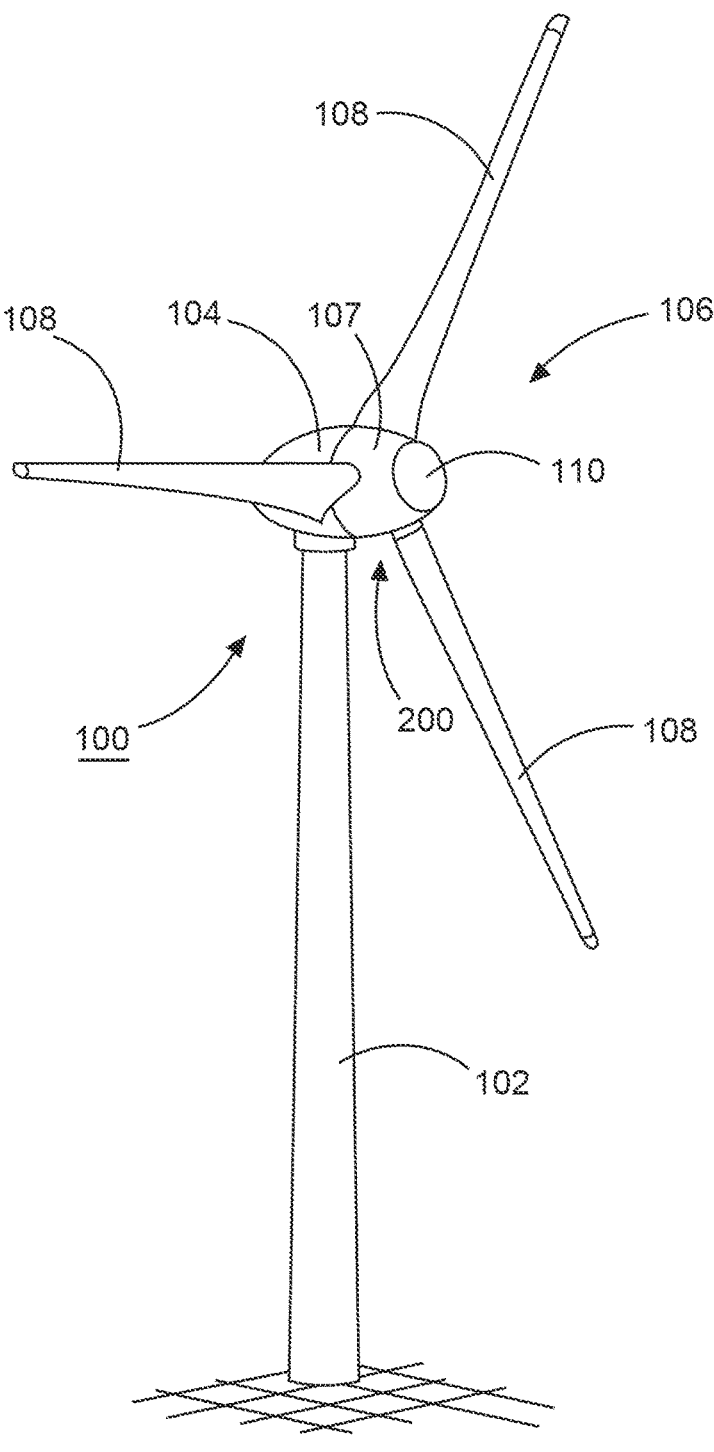
FIG. 1 shows a wind turbine.

FIG. 1 shows a wind turbine 100.

Said wind turbine 100 comprises a tower 102 and a nacelle. Arranged on said nacelle 104 is an aerodynamic rotor 106 having a hub 107 with three rotor blades 108 and a spinner 110.

During operation, the rotor 106 is set in rotating motion by the wind and thereby drives a generator in said nacelle 104.

Said generator is preferably a permanent magnet synchronous generator with an active rectifier, which is designed to control a current of said generator.

Said wind turbine 100 also comprises a sensor 200, in particular an accelerometer, placed in said hub 107, in particular on an inner side of said hub 107 next to a pitch bearing.

Said sensor 200 said sensor is designed to detect a vibration or a sound of said wind turbine 100 and/or said electric generator and/or a wind turbine blade 108.

Figure 2:
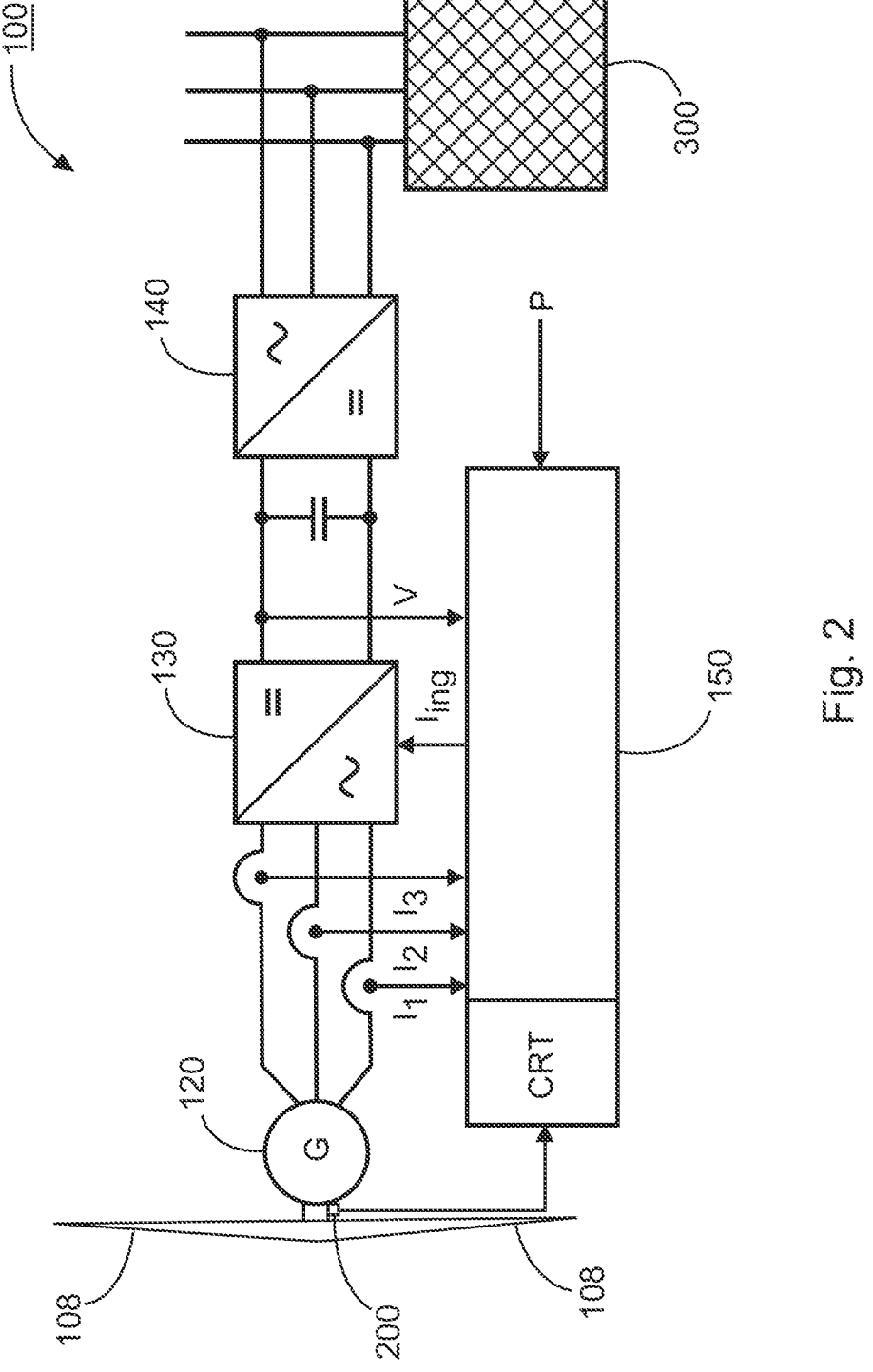
FIG. 2 shows another view of said wind turbine.

FIG. 2 shows another view of said wind turbine 100, in particular as shown in FIG. 1, in a preferred embodiment.

Said rotor blades 108 are mechanically connected to said generator 120 via said hub.

Said generator 120 is connected to an active rectifier 130, which is connected to an inverter 140, which is connected to an electrical supply grid 250.

Preferably, said generator 120 is a permanent magnet synchronous generator.

Said wind turbine 100 also comprises a wind turbine control unit (e.g., wind turbine controller) 150, which is designed to control said wind turbine 100, and in particular said active rectifier 130.

Said wind turbine control unit 150 also comprises a counter ripple torque module 152 for calculating an amplitude or a phase angle of said electric generator 120. For this, said counter ripple torque module 152 is connected to said accelerometer 200, which is placed on an inner side of said hub 107 next to a pitch bearing.

In order to control said wind turbine 100 said wind turbine control unit 150 receives multiple signals, e.g., a measured phase current I1, I2, I3 of said generator 120, a line voltage V between said active rectifier 130 and said inverter 140 and/or a power demand value P for controlling the power output of said wind turbine.

Moreover, said wind turbine control unit 150 is designed to control said active rectifier 130 via a current signal line in order to meet a specific operating point of said wind turbine or generator.

Said wind power control unit 150 may also comprise an interface, which is designed to receive an information, in particular a script, used for the evaluation of said operating point and/or to provide an information about said evaluation to a third party interface.

Figure 3:
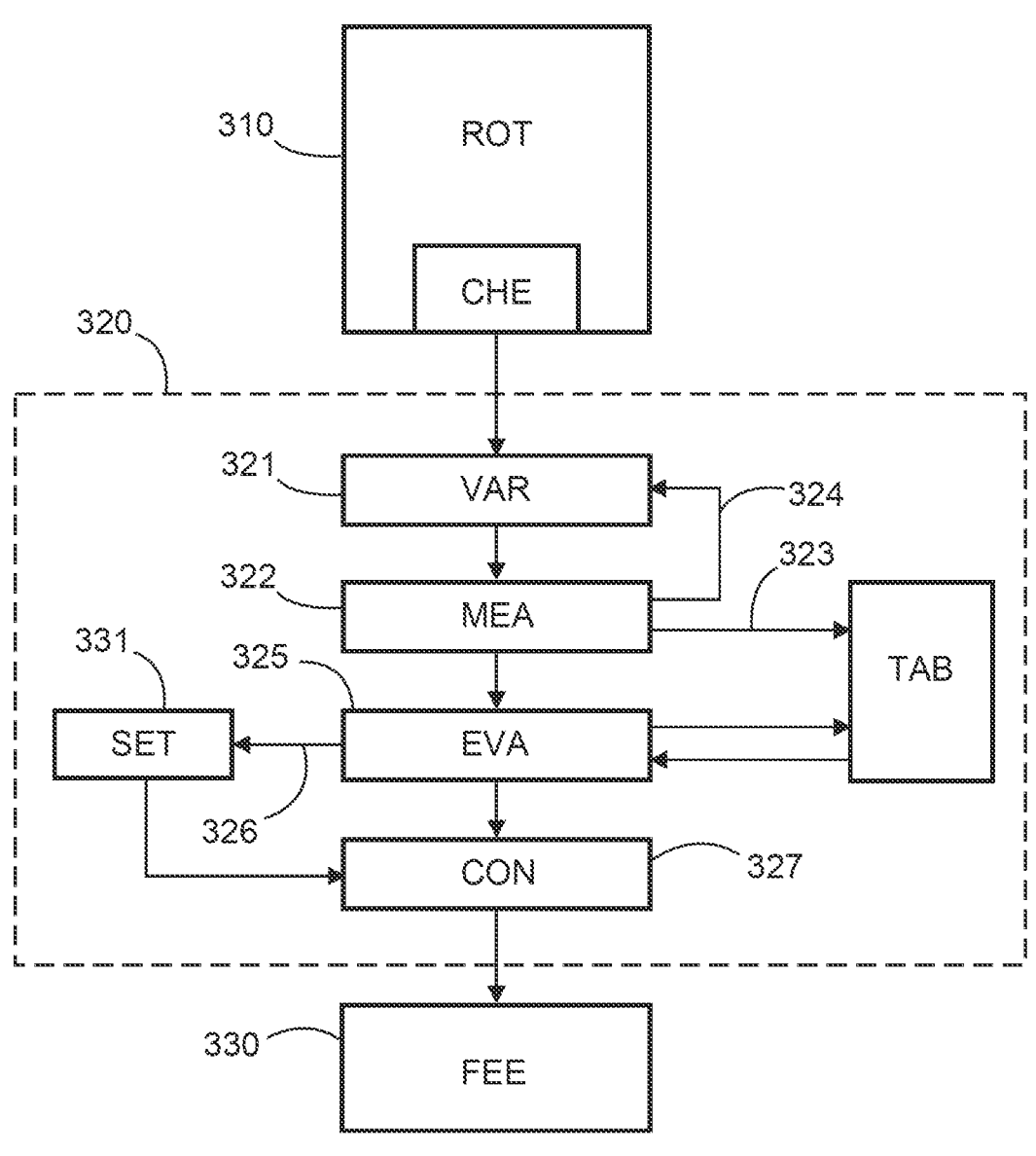
FIG. 3 shows a flowchart of a method.

FIG. 3 shows a flowchart 300 of the proposed method, in particular a method for operating a wind turbine comprising the method for controlling an electric generator.

In a first step 310, the electric generator of said wind turbine is rotating at a known condition, in particular due to normal operations mode of said wind turbine. Therefore, said electric generator is running in a first operating point. This is shown by block ROT.

During the first step 310, it is checked whether the proposed method for controlling said electric generator needs to be started or not, e.g., by measuring the noise of said wind turbine. This is shown by block CHE.

If said noise is too much, said method for controlling an electric generator is started. For this, a predetermined noise limit may be used.

In a second step 320, the proposed method for controlling an electric generator is performed. In a first step of this method 321, an amplitude or phase angle of said electric generator is varied, while said electric generator is rotating, in particular at said known condition. This is shown by block VAR.

In a next step of this method 322, a signal indicative for a generator vibration is measured, in particular after varying said amplitude or phase angle. This is shown by block MEA.

The measured signals or corresponding values may be stored in a lookup table 330, by a step of storing 323.

These steps are repeated multiple times, until a predetermined requirement is met, by a step of repeating 324. For example, the amplitude is varied with each step until a predefined lookup table is fully filled with values.

In a next step of this method 325, in particular when said predetermined requirement is met, an operating point for said electric generator is evaluated by using said measured signals indicative for a generator vibration in order to reduce a ripple torque of said generator. For example, the amplitude providing the lowest noise is taken.

This value may also be used as a new setting for the generator and also be saved in the settings of said wind turbine, e.g., by the step of saving the evaluated value 326.

Afterwards, a current of said electric generator is controlled based on the new setting and/or the evaluated operating point in order to meet said operating point, e.g., by the step of controlling 327.

In the last step 330, electrical energy is fed into an electrical supply grid, while said generator is in said new operating point, namely a second operating point. In this operating point, the wind turbine produces less noise then in the first operating point. This is shown by block FEE.

Hence, a method is provided, wherein an offset variation is executed until enough data is collected. Afterwards, the data is evaluated for each bin and it is checked for the lowest offset, leading to number of points. To make this method more robust, a curve fitting is used, e.g., by using a least-square-method.

Figure 4A:
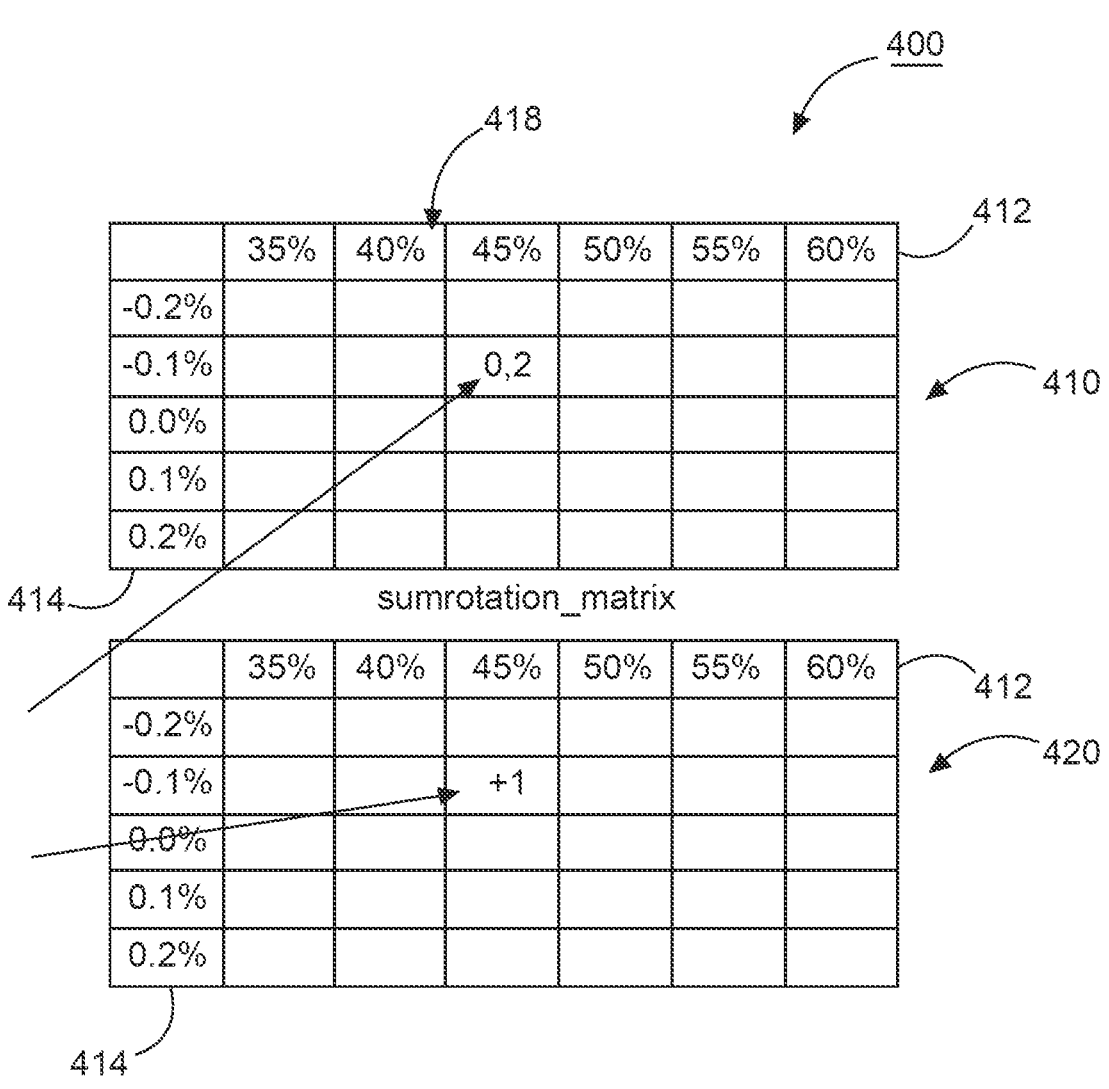
FIG. 4A shows a lookup table which is used in the method.

FIG. 4A shows a lookup table which is used in a preferred embodiment of the proposed method.

The lookup table 400 comprises two parts, namely a result matrix 410 and a corresponding counting matrix 420.

In both matrices 410, 420, the first row 412 is defined by fixed values, in particular the torque over the nominal torque of said electric generator in percent and the first column 414 is defined by fixed values, in particular the offset variation of the phase angle in percent.

In a first step of said method, said phase angle is varied and a specific torque is chosen.

In the shown example, 45% torque/nominal torque and −0.1% phase angle variation.

For this set of values, a signal or value is measured indicating the torque ripple of said electric generator.

The measured value is saved into said result matrix 410 and the counter for this of said counting matrix is set "+1."

In a next step, e.g., after 3 rotations of said electric generator, said phase angle is varied again and a specific torque is chosen again.

Accordingly, the next measured value is then also saved in said result matrix 410 and the counter for this of said counting matrix is again set "+1."

In the result matrix 410, each value is saved as a mean, for example via the equation:

$$m_n = m_{n-1} + \frac{a_n - m_{n-1}}{n}.$$

This process is repeated until a predetermined requirement is met, for example, five values collected for every option of said look up table. Such a lookup table is shown in FIG. 4B.

Figure 4B:
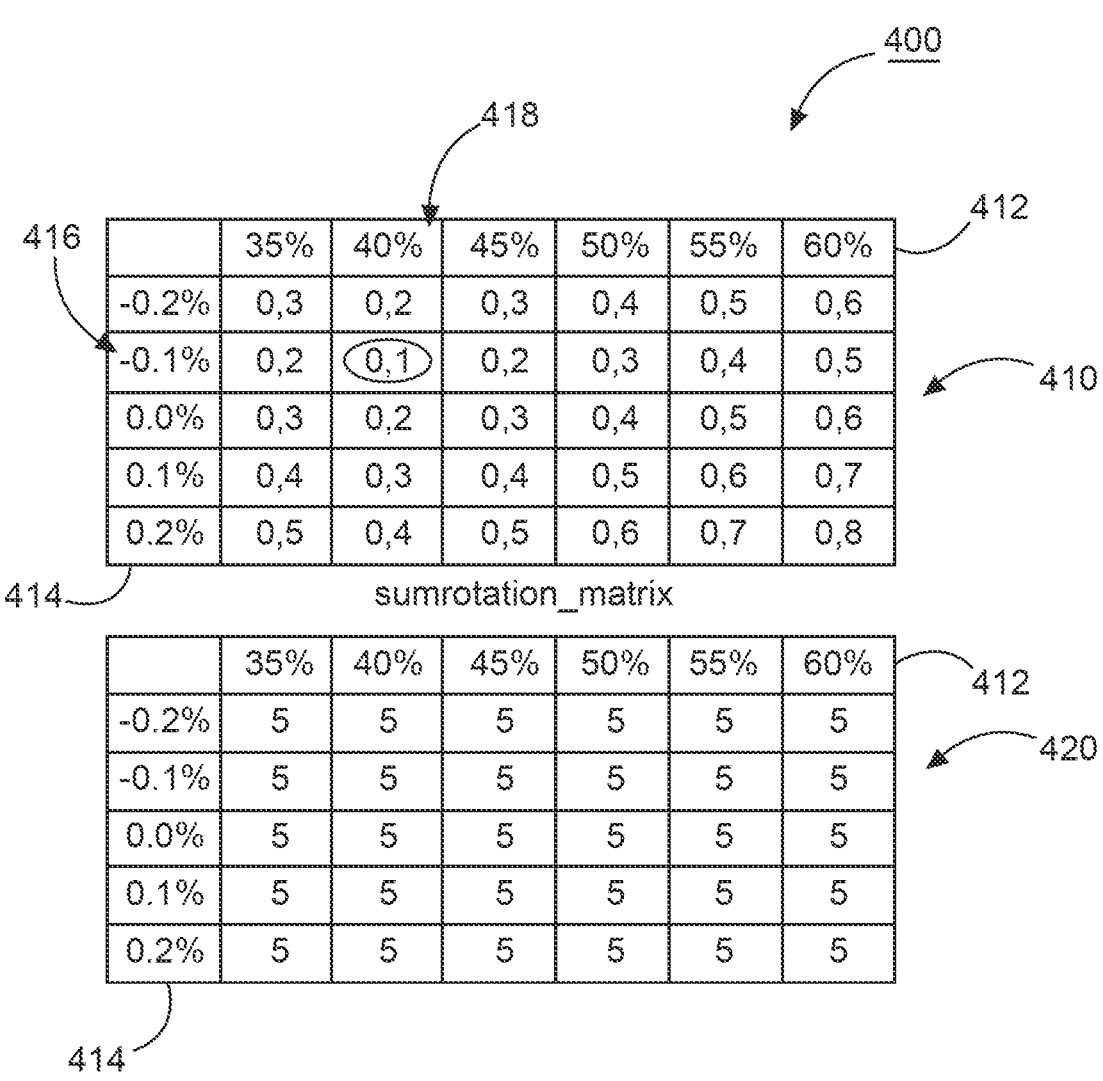
FIG. 4B shows a lookup table which is used in the method, when a predetermined requirement is met.

FIG. 4B shows a lookup table 400, which is used in a preferred embodiment of the proposed method, when a predetermined requirement is met.

Said counting matrix 420 met the predetermined requirement, namely five collected values for every option.

Therefore, the result matrix 410 comprises different values indicating the noise of said generator, wherein the lowest value represents the lowest noise of said generator.

According to the result matrix 410, the generator would produce the lowest noise at a specific phase angle 416, namely one which is −0.1% smaller than the current setting, at specific torque 418, namely 40 percent of the nominal torque of said generator.

In a preferred embodiment, in particular when the wind turbine is a torque controlled wind turbine, the results are saved in the settings so that the wind turbine control unit may choose the phase angle with the lowest value in accordance with the needed torque for proper operation.

For example, if a torque of 60% of the nominal torque is needed, the value 0.5 in the last column would be the lowest and therefore, a −0.1% smaller phase angle would be chosen.

During operation, the values may shift and therefore, the proposed method for controlling an electric generator may be repeated the next day or the next weak, or when said sensor is measuring a high noise, in particular too high noise.

Figure 5:
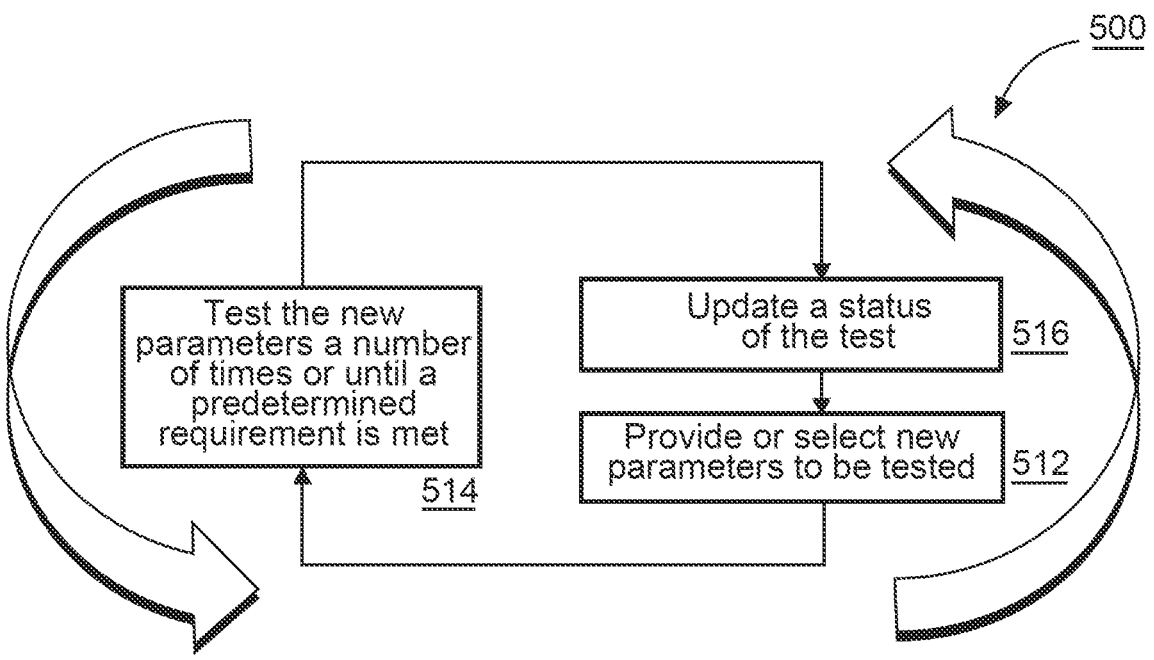
FIG. 5 shows a continuous process using a Nelder-Mead method.

FIG. 5 shows a continuous process 500 in a preferred embodiment, using a Nelder-Mead method.

Said continuous process 510 comprises three steps 512, 514, 516, which are looped.

In a first step 512, new parameters to be tested are selected and/or provided, in particular as described above.

In a next step 514, said new parameters are tested a number of times or until a predetermined requirement is met, as also described above.

Afterwards, the outcome of said test, in particular provided by step 514, is averaged and stored, e.g., in a look-up table.

Preferably, this may be done as long as the turbine operation is present.

In a more preferred embodiment, the status of said test is also updated. This is shown by step 516.

Once the continuous process 500 is finished, e.g., by meeting a predetermined requirement, the best settings may be stored or frozen in a look up table, e.g., a look-up table for a wind turbine or inverter controller, or any other database.

In a preferred embodiment, the best settings may also be converted into polar coordinates and stored as such.

Preferably, said continuous process 500 is used for evaluating an operating point for said electric generator, as described above or below.

Figure 6A:
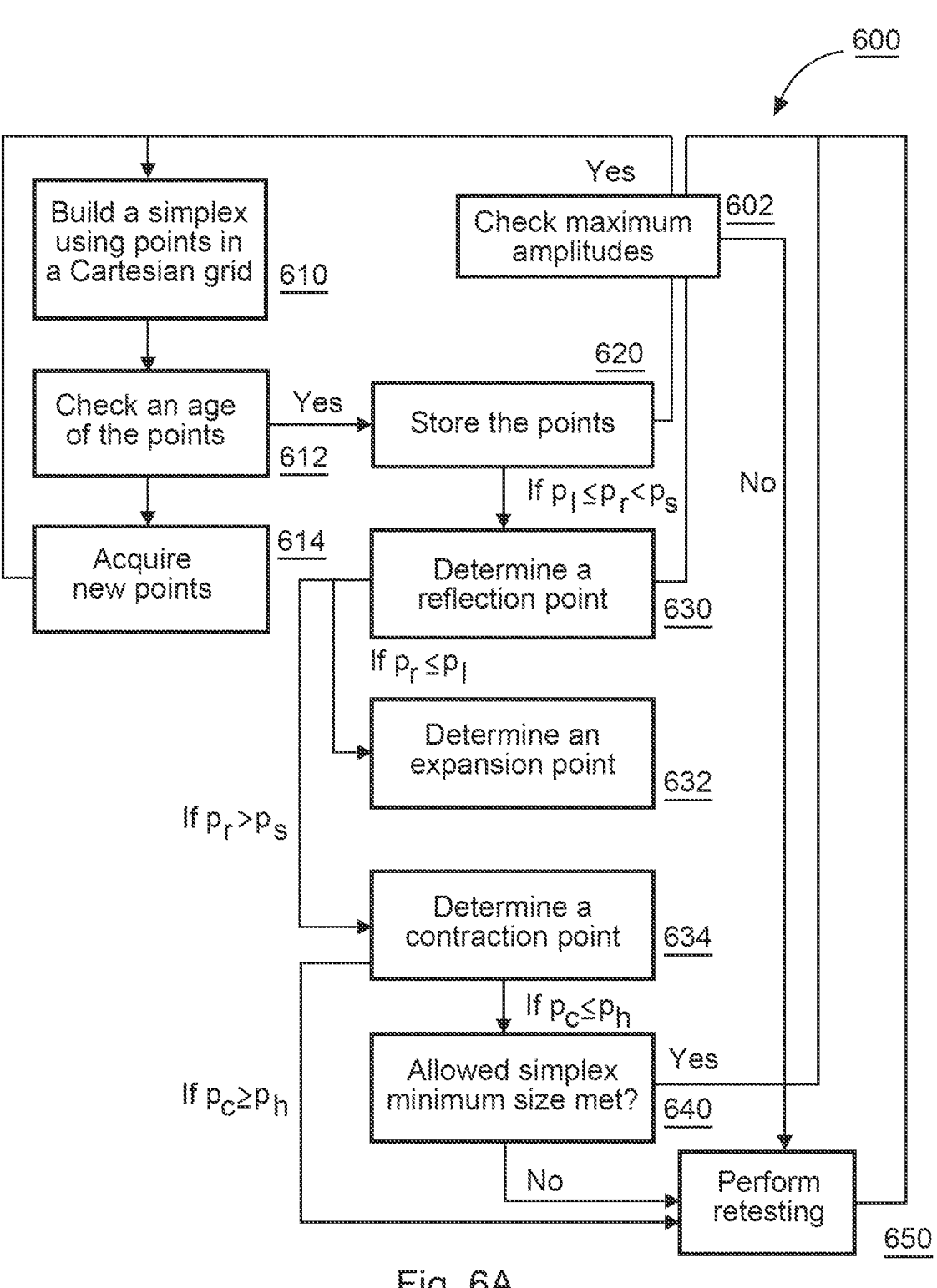
FIG. 6A shows a flowchart for a Nelder-Mead method.

FIG. 6A shows a flowchart 600 for a Nelder-Mead method, in particular as used in the continuous process shown in FIG. 5.

In a first step 610, said method is started, e.g., by building a simplex using points in a Cartesian grid. For this, the basics of a classical Nelder-Mead method may be used.

Starting said method may also comprise a step 612 for checking the age of said points. For this, time stamps may be used. For example, if the age of said points is too high and said points therefore fail the check (No), new points need be acquired in another step 614.

However, if the age of said points is low enough and said points therefore pass the check (Yes), said method proceeds as follows:

In a next step 620, said points are sorted, e.g., the best point $p_l$ having the lowest vibration, the second best point $p_s$ and so on until the worst point $p_h$ having the highest vibration.

In a next step 630, a reflection point $p_r$ is calculated based on the best point $p_l$, the second best point $p_s$ and the worst point $p_h$, e.g., by using the basics of a classical Nelder-Mead method.

Afterwards, several conditions are checked leading to different steps, in particular:

if reflection point $p_r$<best point $p_l$ is true, an expansion point $p_e$ is calculated in a next step 632, if reflection point $p_r$>second best point $p_s$ is true, a contraction point $p_c$ is calculated in a next step 634.

Based on the contraction point $p_c$ several other conditions are checked leading to different steps, in particular:

if contraction point $p_c$<best point $p_h$ is true, it may be checked whether an allowed simplex minimum size is met in a next step 640.

if contraction point $p_c$≥best point $p_h$ is true, the points may be updated.

In a preferred embodiment, said method may also comprises a step of retesting 650, e.g., if the best point $p_h$, the second best point $p_s$ or the worst point $p_l$ has changed.

Moreover, several security algorithms 602 may be implemented, e.g., for checking the maximum amplitudes.

Once the continuous process 600 is finished, e.g., by meeting a predetermined requirement, the best settings may be stored or frozen in a table, e.g., a look-up table for a wind turbine or inverter controller, or any other database.

In a preferred embodiment, the best settings may also be converted into polar coordinates and stored as such.

Figure 6B:
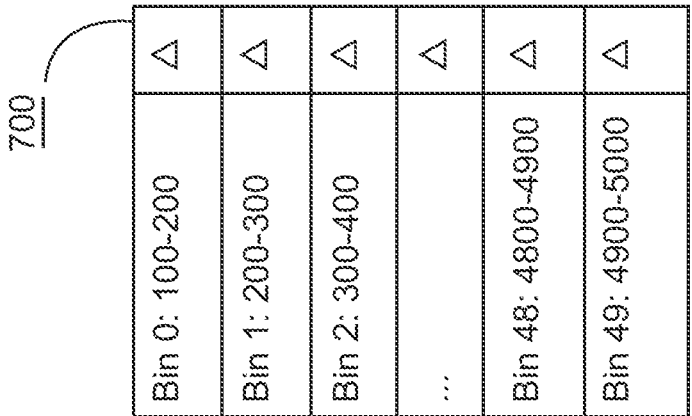
FIG. 6B shows an advanced continuous process using binning.
Figure 6B:
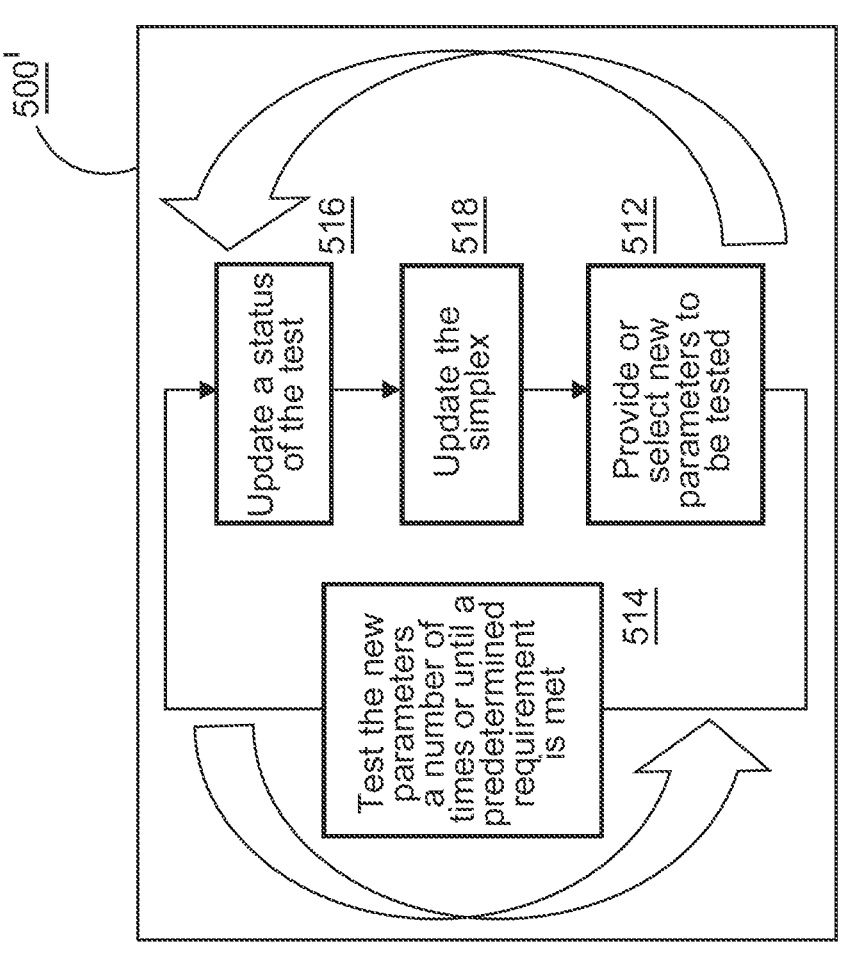

FIG. 6B shows an advanced continuous process 500' using binning.

In this embodiment, said continuous process 500 uses binning leading to an advanced continuous process 500'.

In particular, the wind turbine operation is binned on a turbine variable or a combination of turbine variables, within each bin a simplex will operate, in particular as shown in FIG. 6A.

Therefore, the continuous process, as shown in FIG. 6A, is used for different bins. Said bin may be predetermined and/or set by the turbine manufacturer. In particular, the method of binning is used to optimize the used Nelder-Mead method even further.

In particular, whenever the operating point of the wind turbine shifts into a new bin, said bin is chosen and updated.

In a preferred embodiment, the simplex will be updated whenever the turbine operation enters a bin, in particular whenever the operating point enters a bin. This is shown by the step 518.

For example, the generator current is binned between 400 and 5500 ampere with 50 equidistant bins and outside these bins no or default counter steering is applied, which is shown in the bin table 710. Whenever the operating point shifts into another bin, the simplex will be updated for this bin as show in step 514, e.g., by testing several times.

FIG. 6C shows an example of an advanced bin table 700', which may also be used in a method as shown in FIG. 6A or FIG. 6B.

The advanced bin table 700' is multidimensional.

For example, the generator current is binned between 400 and 5500 ampere with 50 equidistant bins, as already shown by the bin table 700' in FIG. 6B.

In addition, the rotor position is also binned, in particular between zero and 360 degrees with 30 equidistant bins, leading to a 2D bin.

In this example, the amplitude of the generator current and the mechanical angle of the rotor position are binned and used to find optimal counter steering parameters for the binned turbine operation.

For example, the same amplitude and the same phase angle are tested multiple times, e.g., 20 times, and averaged thereafter.

Due to the change of the mechanical angle of the generator during the test, the vibration may vary and therefore, the building of an average may counteract distortions within the test, leading to better results.

The method described herein is, in particular, used to measure harmonics of a generator and counter steer dominated harmonic thereof.

Furthermore, for each generator harmonic an own collection of binned simplexes may be used.

Moreover, multiple sensors may be used to obtain signals indicative for generator vibrations. Said signals may also be weighted, e.g., by a weighting function.

For longer measurement intervals, it might be beneficial to predict the upcoming operational point for choosing the right bin with the resulting optimization parameters.

REFERENCE CHARACTER LIST

100 wind turbine
102 tower of said wind turbine
104 nacelle of said wind turbine
106 aerodynamic rotor of said wind turbine
107 hub of said wind turbine
108 rotor blade of said wind turbine
110 spinner of said wind turbine
120 generator, in particular a permanent magnet synchronous generator
130 active rectifier
140 inverter
150 wind turbine control unit
152 counter ripple torque module
200 sensor, in particular accelerometer
250 electrical supply grid
300 scheme of the proposed method
310 rotating generator at known condition
320 step of performing a method for controlling an electric generator
321 step of varying an amplitude or phase angle
322 step of measuring an indicative signal
323 step of storing the measured signal
324 step of repeating said varying and measuring
325 step of evaluating an operating point
326 step of saving
327 step of controlling
330 lookup table
331 settings
340 feeding electrical energy into an electrical supply grid
400 lookup table
410 result matrix
412 predefined row
414 predefined column
420 counting matrix
500 continuous process
500' continuous process in a preferred embodiment
512 step of: new parameters
514 step of: testing new parameters
516 step of: updating parameters
518: step of: entering new bin and selecting new simplex
600 flowchart for a Nelder Mead method
602 step of: checking amplitudes
610 step of: starting
612 step of: checking simplex point age
614 step of: acquiring new points,
620 step of: sorting points
630 step of: calculating reflection
632 step of: calculating expansion point
634 step of: calculating contraction point
640 step of: checking simplex size
650 step of: retesting
700 bin table
700' advanced bin table
$p_h$ distinctive point with the highest vibration
$p_l$ distinctive point with the lowest vibration
$p_s$ distinctive point with the second lowest vibration
pr reflection point
$p_e$ expansion point
$p_c$ contraction point

The invention claimed is:

1. A method for controlling an electric generator of a wind turbine, comprising:
   operating said electric generator at a first operating point based on a first amplitude and/or a first phase angle;
   varying the first amplitude and/or the first phase angle of a harmonic current of said electric generator, while said electric generator is rotating;
   measuring a signal indicative of a generator vibration after and/or during varying said first amplitude and/or first phase angle;
   repeating said varying and said measuring until a fixed number of signals indicative of the generator vibration are measured, wherein said repeating of the varying and measuring is performed by varying an offset to said first phase angle or said first amplitude;
   determining a second operating point that is different from the first operating point for said electric generator using said signals indicative of the generator vibration, wherein a ripple torque of said electric generator is reduced at said second operating point relative to said first operating point; and
   controlling a current of said electric generator to meet said second operating point based on a second amplitude that is different from the first amplitude and/or a second phase angle that is different from the first phase angle,
   wherein said wind turbine further comprises a wind turbine controller and said method further comprises:
   implementing new parameters in said wind turbine controller based on said second operating point, wherein the new parameters include at least the second amplitude and/or the second phase angle.

2. The method for controlling the electric generator according to claim 1, wherein said first amplitude or first phase angle is varied using a converter connected to said electric generator.

3. The method for controlling the electric generator according to claim 1, wherein said first amplitude or first phase angle are calculated using a counter ripple torque module.

4. The method for controlling the electric generator according to claim 1, wherein varying the first amplitude and/or first phase angle of the harmonic current including injecting a current.

5. The method for controlling the electric generator according to claim 1, wherein said signal indicative for the generator vibration is measured by a sensor placed on a hub or other structural part of said wind turbine.

6. The method for controlling the electric generator according to claim 1, wherein said repeating of the varying and measuring is performed sequentially until said fixed number of signals indicative of the generator vibration are measured.

7. The method for controlling the electric generator according to claim 1, wherein said second operating point is determined to reduce vibrations of the 6th harmonic or a multiple of said 6th harmonic of said electric generator.

8. The method for controlling the electric generator according to claim 1, wherein said new parameters include at least a torque set point.

9. The method for controlling the electric generator according to claim 1, wherein said second operating point is generated using an adaptive or self-learning controller and/or by offset variation.

10. The method for controlling the electric generator according to claim 1, wherein said determining is performed based on a lookup table or by feedback loop control.

11. The method for controlling the electric generator according to claim 1, wherein:

said determining includes a numerical method, an objective function, a simplex, a direct search method, a Nelder-Mead method and/or data binning; and/or said second operating point is generated by a numerical method, an objective function, a simplex, a direct search method, a Nelder-Mead method and/or data binning.

12. The method for controlling the electric generator according to claim 1, wherein:

said determining of the second operating point includes a continuous process using a numerical method, an objective function, a simplex, a direct search method, a Nelder-Mead method and/or data binning; and/or said second operating point is generated by a continuous process using a numerical method, an objective function, a simplex, a direct search method, a Nelder-Mead method and/or data binning.

13. The method for controlling the electric generator according to claim 1, wherein:

said second operating point is represented by at least one or more mechanical states of said electric generator; and/or said second operating point includes at least one information of:

a rotational position of a rotor of said electric generator;

a temperature of said electric generator;

a speed of said electric generator;

a current of said electric generator; or a torque of said electric generator.

14. A method for operating a wind turbine, comprising:

rotating an electric generator of said wind turbine at a known rotational speed and/or known torque at a first operating point for said electric generator based on a first amplitude and/or a first phase angle;

controlling the electric generator by at least:

varying the first amplitude and/or the first phase angle of a harmonic current of said electric generator, while said electric generator is rotating;

measuring a signal indicative of a generator vibration after and/or during varying said first amplitude and/or first phase angle;

repeating said varying and said measuring until a fixed number of signals indicative of the generator vibration are measured, wherein said repeating of the varying and measuring is performed by varying an offset to said phase angle or said amplitude;

determining a second operating point that is different from the first operating point for said electric generator using said signals indicative of the generator vibration, wherein a ripple torque of said electric generator is reduced at said second operating point relative to said first operating point; and controlling a current of said electric generator to meet said second operating point based on a second amplitude that is different from the first amplitude and/or a second phase angle that is different from the first phase angle; and feeding electrical energy into an electrical supply grid, while said electric generator is in said second operating point, wherein said wind turbine further comprises a wind turbine controller and controlling the electric generator further comprises:

implementing new parameters in said wind turbine controller based on said second operating point, wherein the new parameters include at least the second amplitude and/or the second phase angle.

15. The method for operating the wind turbine according to claim 14, wherein controlling the electric generator is started in response to a first criterion being met.

16. The method for operating the wind turbine according to claim 15, wherein said first criterion is checked by the wind turbine controller.

17. The method for controlling an electric generator according to claim 14, wherein controlling the electric generator is started in response to a conditional criterion being met.

18. The method for controlling an electric generator according to claim 17, wherein said conditional criterion is checked by the wind turbine controller.

19. The method for operating the wind turbine according to claim 14, comprising:

suppressing controlling the electric generator in response to a sensor detecting that the generator vibration is greater than a threshold or in response to a time being between 10 p.m. and 6 a.m.

20. A wind turbine, comprising:

the electric generator, which is controlled by the method according to claim 1.

21. The wind turbine according to claim 20, comprising: a sensor placed on a hub of said wind turbine.

22. The wind turbine according to claim 21, wherein said sensor is configured to detect a vibration or a sound of said wind turbine, said electric generator and/or a wind turbine blade.

23. The wind turbine according to claim 21, wherein said sensor is an outdoor microphone or an accelerometer.

24. The wind turbine according to claim 20, wherein the wind turbine controller has a counter ripple torque module configured to calculate the second amplitude or the second phase angle of said electric generator.

25. The wind turbine according to claim 24, comprising:
a converter coupled to said wind turbine controller and
said electric generator and configured to control the
current of said electric generator.

26. The wind turbine according to claim 20, comprising:
an interface configured to:

receive information used for the determining of said
second operating point; and/or send information indicating said determining to a third
party interface.

27. The wind turbine according to claim 20, wherein said
electric generator is a permanent magnet synchronous hav-
ing an active rectifier configured to control the current of
said electric generator, and wherein the controlling includes
controlling the active rectifier via a current signal line to
meet said second operating point.

28. The wind turbine according to claim 20, wherein the
wind turbine controller is configured to determine whether a
criterion for performing said determining of the second
operating point is met.

29. The wind turbine according to claim 20, comprising:

an adaptive controller configured to perform an offset
variation method to obtain the second operating point.

30. The method for controlling the electric generator
according to claim 1, wherein controlling the current of the
electric generator includes controlling the harmonic current.

31. The method for controlling the electric generator
according to claim 2, wherein said amplitude or phase angle
is varied using an active rectifier connected to said electric
generator, and wherein the controlling includes controlling
the active rectifier via a current signal line to meet said
second operating point.

32. The method for controlling the electric generator
according to claim 4, wherein varying the first amplitude
and/or first phase angle of the harmonic current including
injecting a 6th or 12th harmonic relative to a fundamental
current frequency.

* * * * *